United States Patent
Huang

(10) Patent No.: US 7,154,830 B2
(45) Date of Patent: Dec. 26, 2006

(54) RF RIPPLE SIGNAL COMPENSATOR USED WITH DEFECT DETECTION AND FINGERPRINT DETECTION WITH HELP OF DUAL A/D CONVERTER

(75) Inventor: Chao-Ming Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 615 days.

(21) Appl. No.: 10/702,552

(22) Filed: Nov. 7, 2003

(65) Prior Publication Data

US 2004/0257946 A1 Dec. 23, 2004

(30) Foreign Application Priority Data

Jun. 19, 2003 (TW) ................. 92116709 A

(51) Int. Cl.
*G11B 7/00* (2006.01)
(52) U.S. Cl. ................. 369/53.15; 369/59.21
(58) Field of Classification Search ........... 369/59.21, 369/53.15

See application file for complete search history.

(56) References Cited

U.S. PATENT DOCUMENTS

| 6,041,028 | A | 3/2000 | Quan et al. |
| 6,167,001 | A | 12/2000 | Wu |
| 6,167,011 | A | 12/2000 | Sun et al. |
| 6,859,424 | B1* | 2/2005 | Wang et al. ............. 369/44.28 |
| 7,027,085 | B1* | 4/2006 | Watanabe ................ 348/218.1 |
| 2002/0093904 | A1 | 7/2002 | Armitage et al. |
| 2002/0141314 | A1 | 10/2002 | Yang |
| 2002/0181374 | A1 | 12/2002 | Lai |

* cited by examiner

*Primary Examiner*—Gautam R. Patel
(74) *Attorney, Agent, or Firm*—Birch, Stewart, Kolasch & Birch, LLP.

(57) ABSTRACT

A dynamic compensation device for radio frequency ripple signals of an optical storage system is disclosed. The device is composed of a radio frequency ripple signal process circuit, a radio frequency signal process circuit, a radio frequency signal peak detector, a first analog to digital converter, a second analog to digital converter, a defect detector, and a fingerprint detector. The drop-out of the central level of the radio frequency ripple signal is eliminated, and the track cross waveform is prevented from being damaged.

6 Claims, 13 Drawing Sheets

US 7,154,830 B2

RF RIPPLE SIGNAL COMPENSATOR USED WITH DEFECT DETECTION AND FINGERPRINT DETECTION WITH HELP OF DUAL A/D CONVERTER

This nonprovisional application claims priority under 35 U.S.C. § 119(a) on Patent Application No(s). 092116709 filed in Taiwan on Jun. 19, 2003, the entire contents of which hereby incorporated by reference.

BACKGROUND OF THE INVENTION

1. Field of Invention

The invention relates to a dynamic radio frequency ripple signal compensator, and more particular to that applied in an optical storage system.

2. Related Art

The operation mode of the radial laser spot positioning system of an optical storage device falls into two types: the track following mode and the track seeking mode. The track seeking mode is further divided into long distance track seeking mode and short distance track seeking mode. During a short distance track seeking operation, the laser spot position and velocity relative to the tracks on an optical disk are detected by measuring the tracking error signal and the radio frequency ripple signal, whose phase difference is 90 degrees. Here, the radio frequency ripple signal is also named as focus sum signal or track sum signal. However, the intensity of the reflected laser from the optical disk is easily affected by a lens shift of the optical pickup head, fingerprints or dirt on the disk, or the reflectivity irregularity of the disk. This situation causes drop-out of the center level or distortion on the track cross waveform of the radio frequency ripple signal, which results in position or velocity detection error. Therefore, the stability of the radial laser spot positioning system of the optical storage device cannot be maintained at this moment.

U.S. Pat. No. 6,167,001 discloses two approaches to generate the radio frequency ripple signal. One approach uses a peak/bottom detector to generate the signal, and the other uses a low pass filter.

FIG. 1 illustrates the peak/bottom detector method to generate the radio frequency ripple signal. The photo detectors 101~104 detect the laser beam reflected from the optical disk to the pickup head. The other two photo detectors 105 and 106 detect the tracking error signal of the CD disk, $TE_{CD}$. The output signals of the photo detector 105 and the photo detector 106 are delivered to the differential preamplifier 109, and then the high frequency noise in the signal is filtered by the first low pass filter 112. The tracking error signal $TE_{CD}$ of the CD disk is then obtained. The output signals of the photo detector 101, the photo detector 102, the photo detector 103 and the photo detector 104 are delivered to the differential phase detection preamplifier 108, and the high frequency noise in the signal is then filtered by the second low pass filter 111. The tracking error signal of the DVD disk, $TE_{DVD}$, is then obtained. The outputs signals of photo detectors 101~104 are also delivered to the summing preamplifier 107 for generating the radial frequency signal, RF. The radial frequency signal is then delivered to the peak/bottom detector 110 to generate the radial frequency ripple signal, RFRP.

The peak/bottom detector 110 detects the peak/bottom value of the radio frequency signal after receiving the signal, and dynamically determines the central level of the radio frequency signal by averaging the peak/bottom value of the radio frequency signal. The central level of the signal is used to generate the radio frequency ripple signal. In the peak/bottom detector 110, the dynamic response of the peak detector is slower, while the dynamic response of the bottom detector is faster.

FIG. 2 illustrates the related signals of FIG. 1. The number 201 denotes the radio frequency signal RF. The number 202 denotes the radio frequency signal peak envelope RFPE, while 203 denotes the radio frequency signal bottom envelope RFBE. The tracking error signal $TE_{DVD}$ of the DVD disk is symbolized by the number 204, while the tracking error signal $TE_{CD}$ of the CD disk is symbolized by 205. The radio frequency ripple signal RFRP uses the number 206. The optical disk 209 has lands 207 and grooves 208. It is obvious from the figure that there is a phase difference with 90 degrees between the tracking error signal ($TE_{DVD}$ or $TE_{CD}$) and the radio frequency ripple signal RFRP.

The greater noise and lower accuracy of the generated radio frequency ripple signal are the main drawbacks of this approach as shown in FIG. 2. Also, in order to eliminate the high frequency noise of the tracking error signal $TE_{CD}$ of the CD disk or that of the tracking error signal $TE_{DVD}$ of the DVD disk, the tracking error signal ($TE_{DVD}$ or $TE_{CD}$) is delivered to a low pass filter (the first low pass filter 112 or the second low pass filter 111). This leads to a phase difference between the radio frequency ripple signal RFRP and the tracking error signal $TE_{CD}$ of the CD disk or a difference between the radio frequency ripple signal RFRP and the tracking error signal $TE_{DVD}$ of the DVD disk. The phase difference varying with the frequency of the above signals destroys the 90-degree phase difference relationship between the radio frequency ripple signal and the tracking error signal. This situation may result in position or velocity detection error during a short distance track seeking operation.

Another approach for generating the radio frequency ripple signal is disclosed in FIG. 3. The radio frequency signal is generated by the summing preamplifier 107, which sums the output signals of the photo detectors 101~104. The high frequency components of the radio frequency signal is then filtered by the third low pass filter 301, thereby obtaining the radio frequency ripple signal RFRP. This approach provides the same phase difference as the radio frequency ripple signal RFRP and the tracking error signal. The radio frequency ripple signal RFRP filtered by the third low pass filter 301 is cleaner. Therefore, the 90-degree phase difference relationship between the radio frequency ripple signal and the tracking error signal may be maintained. As shown in FIG. 4, there is less noise in the radio frequency ripple signal 401.

No matter which approach is adopted to generate the radio frequency ripple signal, the drop-out of the central level of the radio frequency ripple signal RFRP always appears due to the intensity variation of the laser beam reflected from the optical disk to the pickup head. There are two reasons for this phenomenon. The first is the lens shift of the optical pickup head. The intensity of the leaser beam reflected from the optical disk does not weaken. However, the lens shift causes the photo detectors to be unable to receive all of the reflected laser beam. The first phenomenon often happens in short distance track seeking operations, as illustrated in FIG. 5. As shown in FIG. 5, 501 represents the tracking error signal $TE_{DVD}$ of the DVD disk. 502 represents the radio frequency ripple signal RFRP. 503 is the radio frequency signal RF. 504 is the peak envelope of the radio frequency signal RFPE, while 505 is the bottom envelope of the radio frequency signal RFBE. Because of the lens shift during the short distance track seeking operation, the photo detectors cannot receive all of the reflected laser beam, and drop-out of the central level of the radio frequency ripple signal occurs.

The other reason for the drop-out phenomenon is due to the fingerprints or dirt on the disks or reflectivity irregularity of the disks, which causes variation of the intensity of the reflected laser beam from the disk to the pickup head. As illustrated in FIG. 6, 601 represents the tracking error signal $TE_{DVD}$ of the DVD disk. 602 represents the radio frequency ripple signal RFRP. 603 is the radio frequency signal RF. 604 is the peak envelope of the radio frequency signal RFPE, while 605 is the bottom envelope of the radio frequency signal RFBE. The radio frequency ripple signal 602 undergoes a serious drop-out at its central level, and the fingerprints on the disks also distort the track cross waveform. Comparing the two types of drop-out, the shift level of the first type drop-out is smaller and the dynamic response in frequency domain is low, while that of the second type is much more acute and the dynamic response in frequency domain covers a wide range, including the frequencies of the track cross waveform. Accordingly, the track cross waveform of the radio frequency ripple signal may be distorted.

U.S. Pat. No. 6,041,028 and No. 6,167,011 and U.S. laid-Open No. 20020141314 and 20020181374 disclose some solutions to solve the drop-out problem of the radio frequency ripple signal. These approaches convert the radio frequency ripple signal into a digitized RFRP zero cross signal, RFZC, first. Then, the symmetry error of the digitized RFRP zero cross signal, RFZC, is employed to compensate the radio frequency ripple signal. When the drop-out of the radio frequency ripple signal appears, the duty cycle of the digitized RFRP zero cross signal, RFZC, becomes asymmetric. And the symmetry error is then integrated by an integrator in the compensation loop and the output of the compensation loop is used to compensate the radio frequency ripple signal. However, the dynamic response of the compensation loop is also limited by the integrator. Therefore, the compensation for the drop-out of the central level of the radio frequency ripple signal caused by fingerprints or dirt on the disks which covers a wide range in frequency domain is not satisfactory.

U.S. laid-Open No. 20020093904 also discloses another approach to compensate the drop-out of the radio frequency ripple signal. This method involves delivering the radio frequency ripple signal to a peak detector and a bottom detector. Then, the average of the output signals of the peak detector and the bottom detector is employed as the central level of the radio frequency ripple signal. Although the disclosed approach solves the drop-out of the central level caused by lens shift, the drop-out caused by the fingerprints or dirt on the disk still cannot be compensated. This is because the dynamic response of the compensation loop cannot be faster than the frequencies of the track cross waveform, as it would need to detect the peak value and the bottom value of the track cross waveform of the radio frequency ripple signal in the peak detector and the bottom detector. Slower response results in ineffective detection of the drop-out of the central level and inability to compensate.

SUMMARY OF THE INVENTION

The main object of the invention is to eliminate the drop-out of the center level or distortion on the track cross waveform of the radio frequency ripple signal caused by a lens shift of the optical pickup head, fingerprints or dirt on the disk, or the reflectivity irregularity of the disk in order to obtain a more stable radio frequency ripple signal during a short distance track seeking operation.

The disclosed compensation device for the radio frequency ripple signal includes a radio frequency ripple signal process circuit for generating the radio frequency ripple signal, a radio frequency signal process circuit for generating a radio frequency signal, a radio frequency signal peak detector, which is coupled to the output of the radio frequency signal process circuit to thereby generate a radio frequency signal peak envelope, a first analog to digital converter, which is coupled to the radio frequency ripple signal process circuit for converting the radio frequency ripple signal, a second analog to digital converter, which is coupled to the radio frequency signal peak detector for converting the radio frequency signal peak envelope, a defect detector, which is coupled to the first analog to digital converter and the second analog to digital converter for detecting a defect on optical disk, a fingerprint detector, which is coupled to the first analog to digital converter and the second analog to digital converter for detecting a fingerprint or dirt on optical disk, and an initialization controller, which is coupled to the defect detector, the fingerprint detector, the first analog to digital converter and the second analog to digital converter.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide further understanding of the invention and are incorporated in and constitute a part of this application, illustrate embodiments of the invention and together with the description serve to explain the principle of the invention and thus are not limitative of the invention. In the drawings.

DETAILED DESCRIPTION OF THE INVENTION

Figure 1:
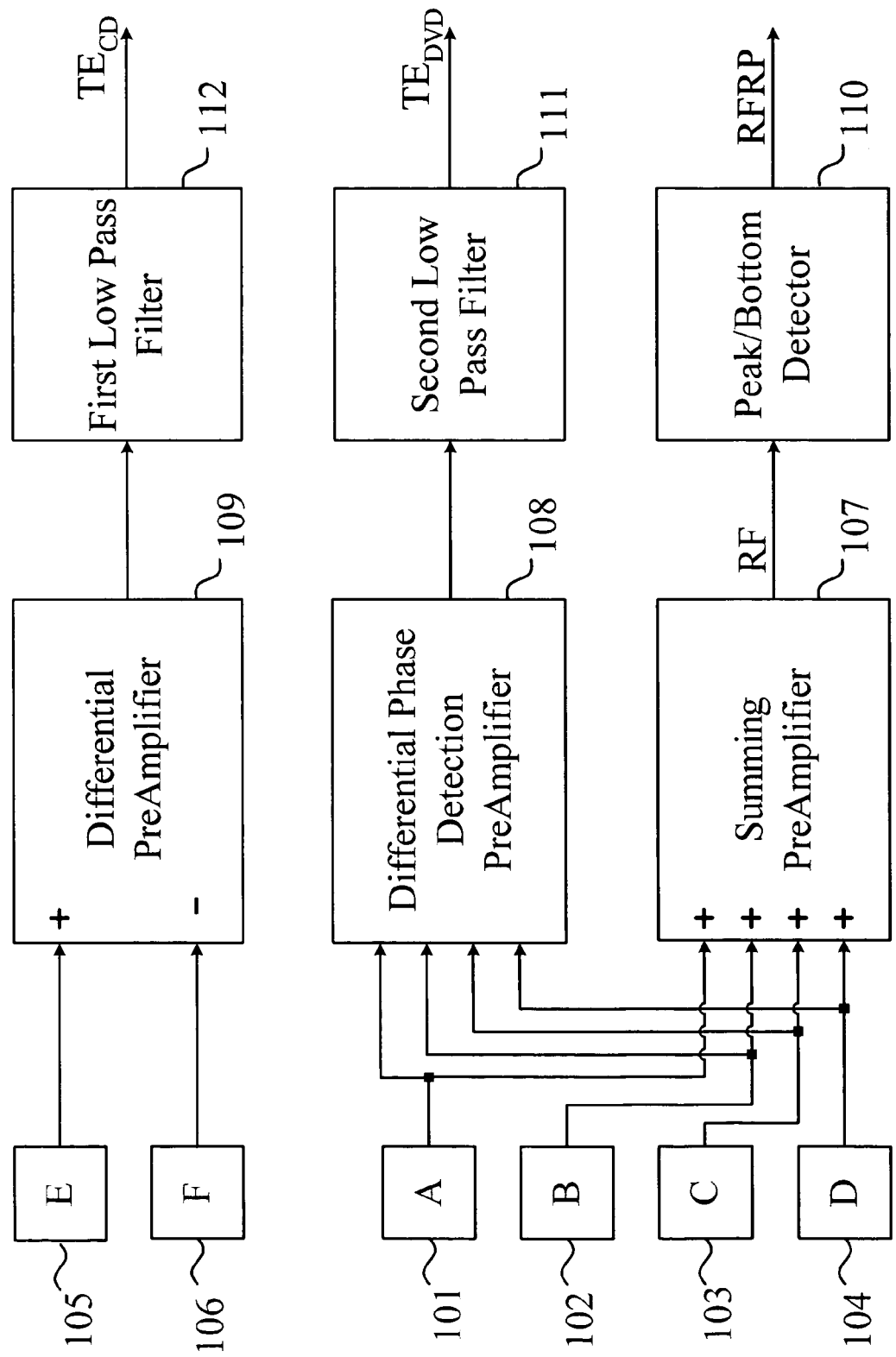
FIG. 1 is the circuit for generating the radio frequency ripple signal of the prior art.
Figure 2:
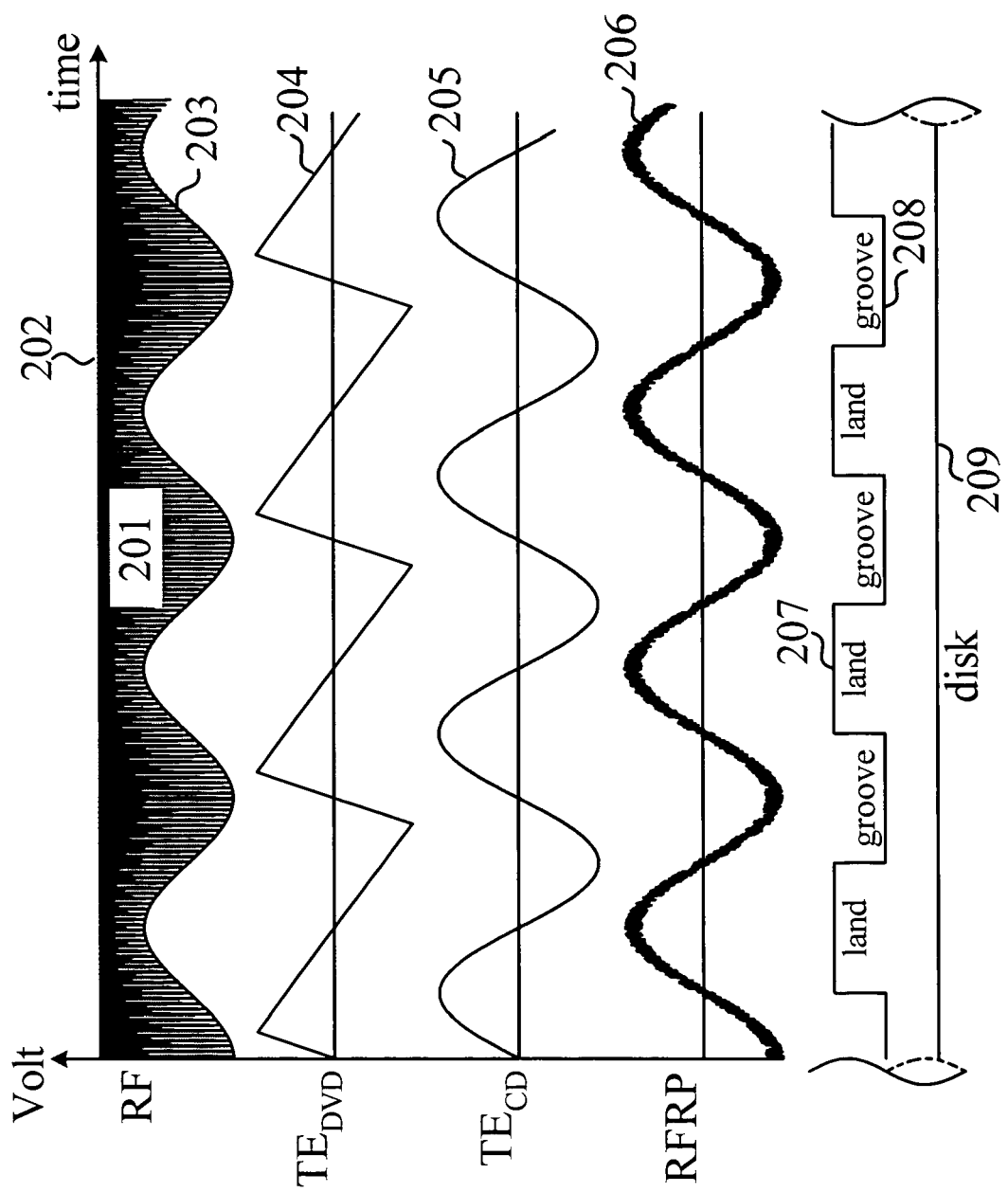
FIG. 2 shows the signals generated by the circuit of FIG. 1.
Figure 3:
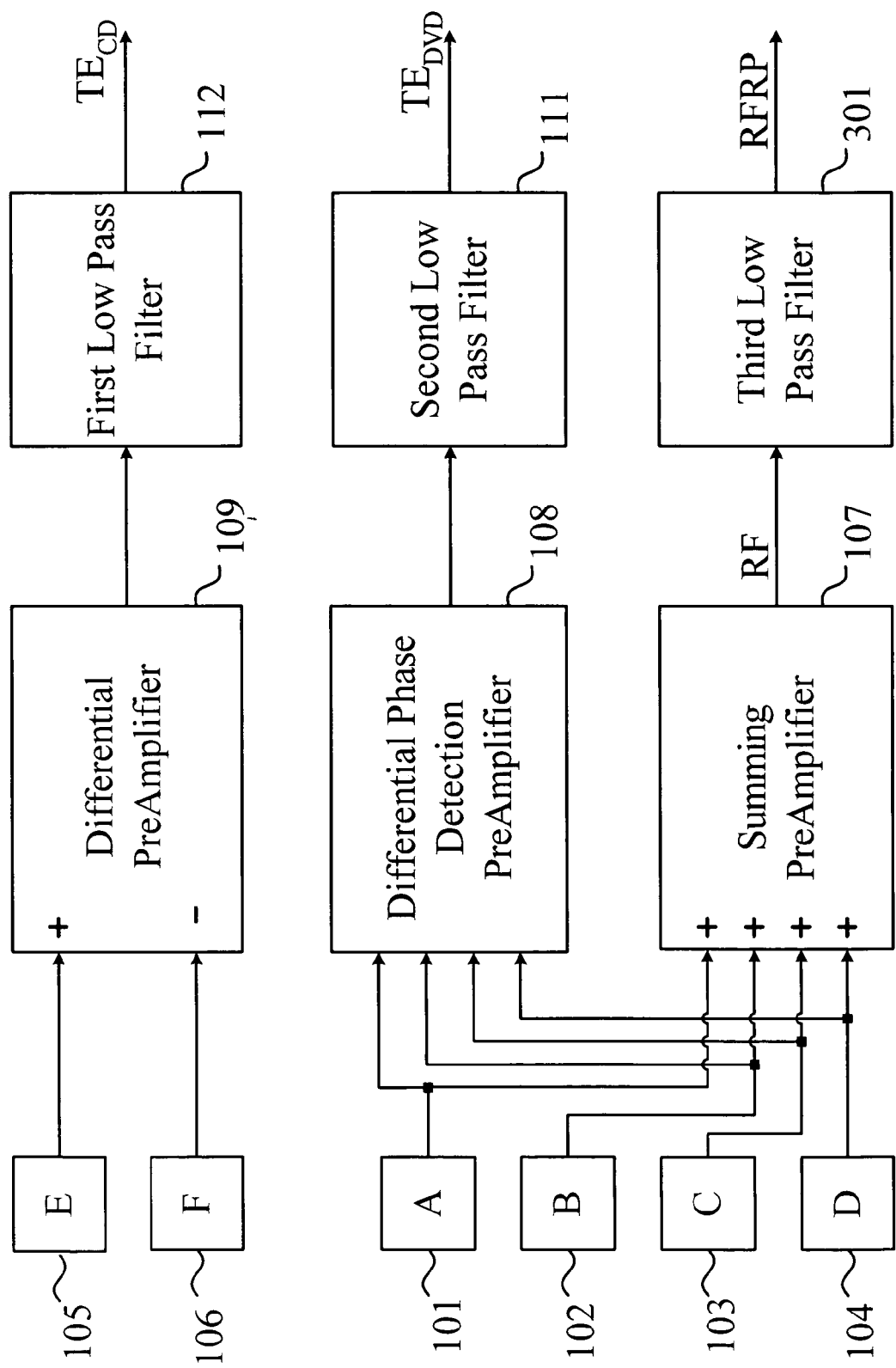
FIG. 3 is the circuit for generating the radio frequency ripple signal of the prior art.
Figure 4:
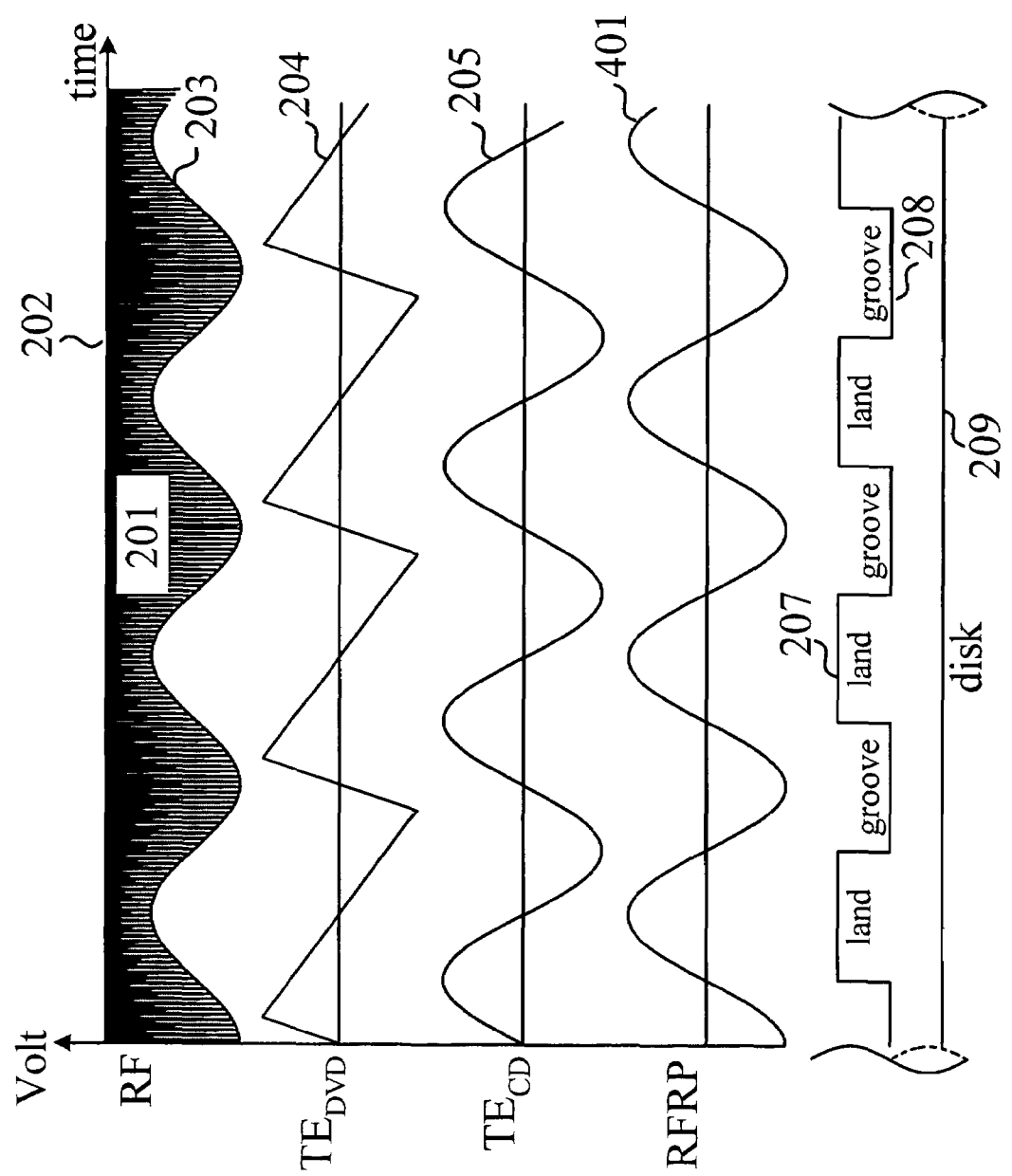
FIG. 4 shows the signals generated by the circuit of FIG. 3.
Figure 5:
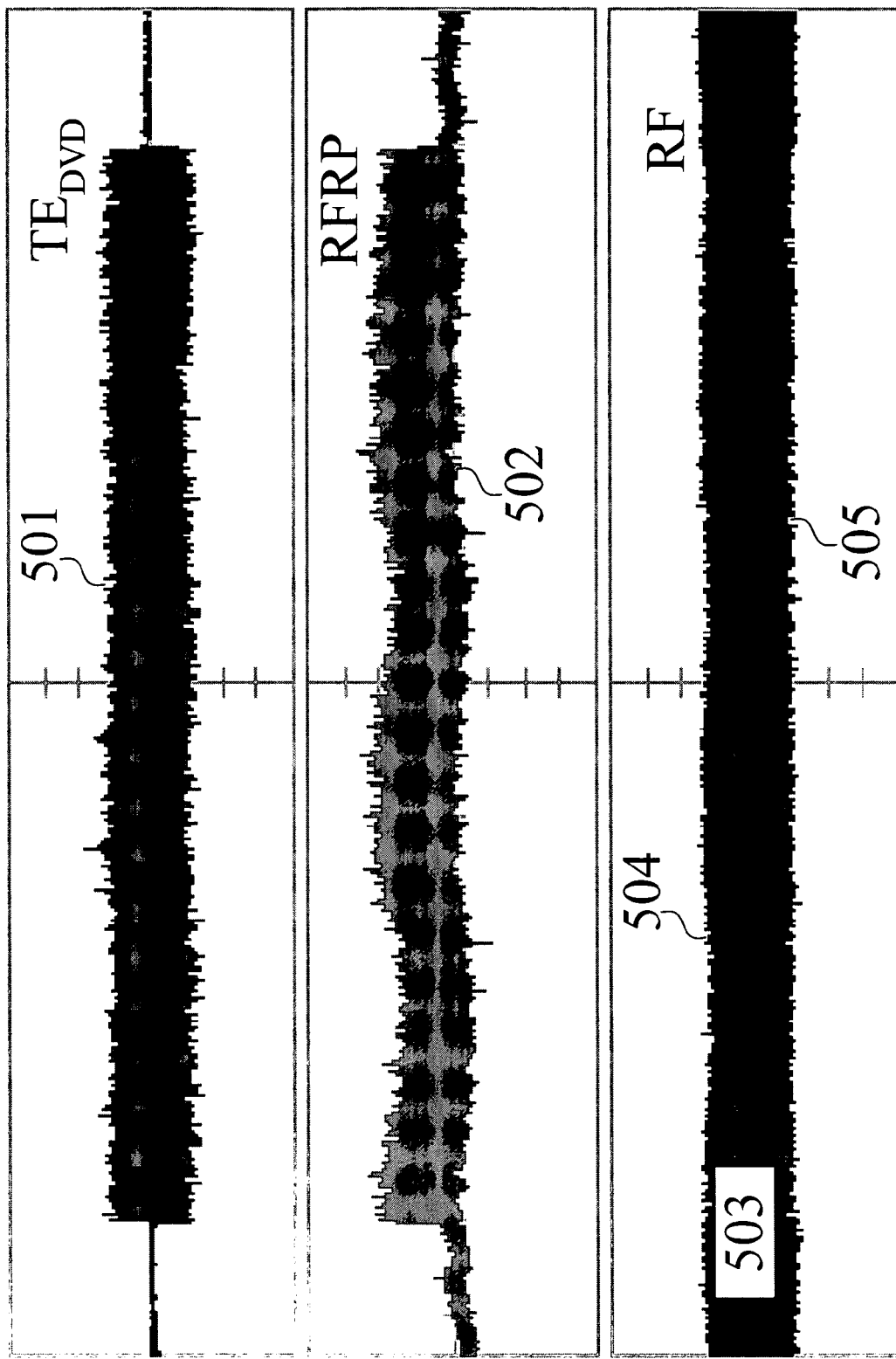
FIG. 5 shows the drop-out of the central level of the radio frequency ripple signal caused by the lens shift of the optical pickup head.
Figure 6:
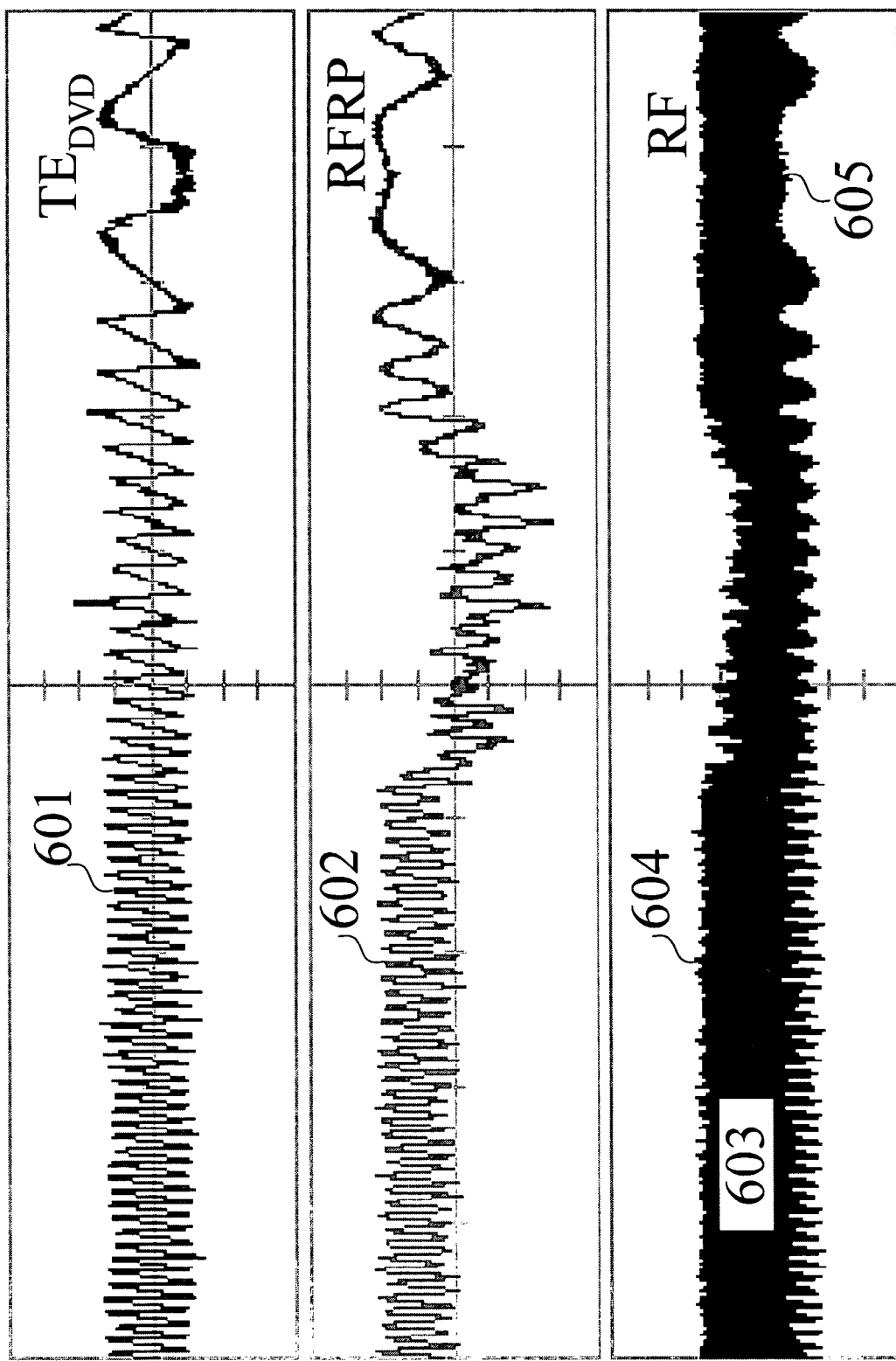
FIG. 6 shows the drop-out of the central level of the radio frequency ripple signal caused by fingerprints or dirt on the disks.
Figure 7:
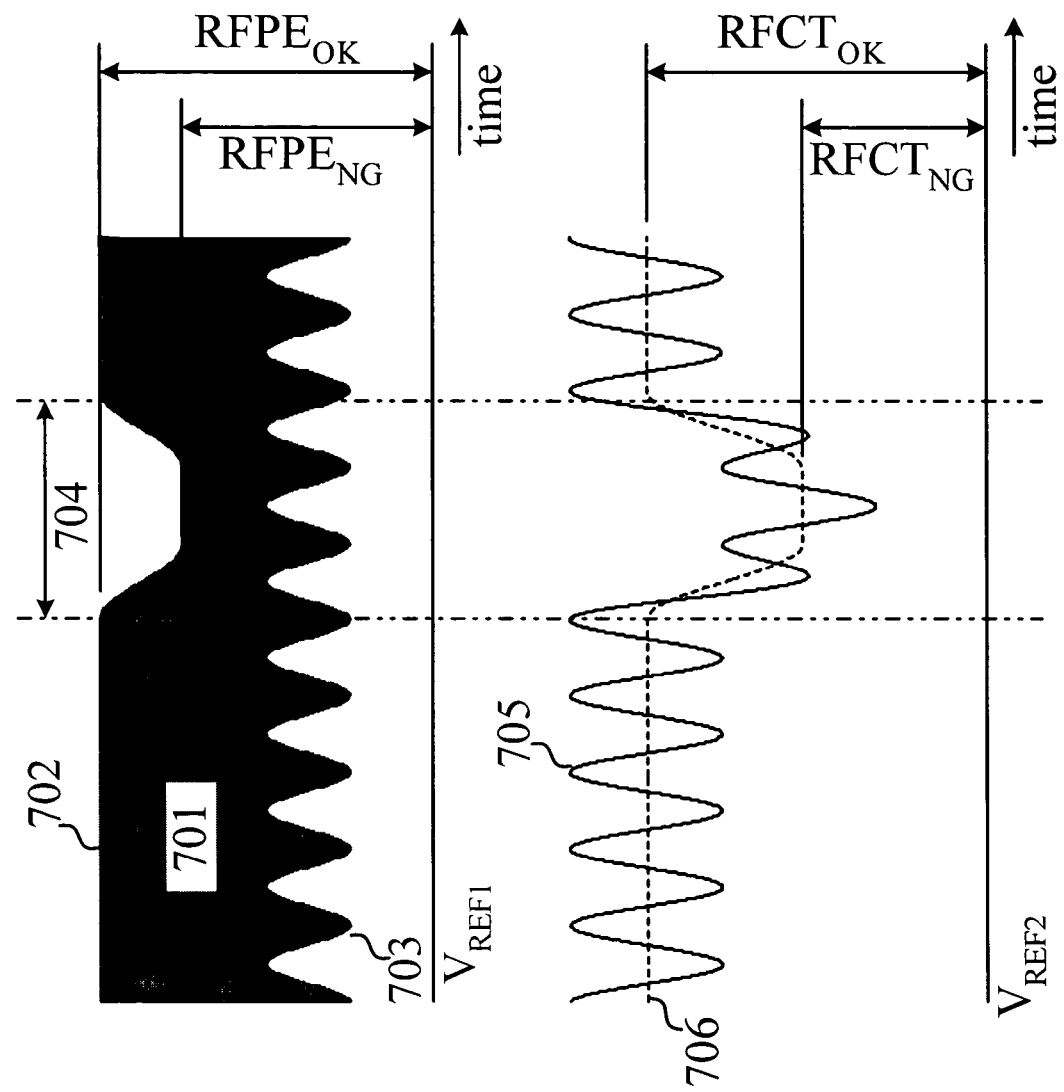
FIG. 7 shows the relationship between the central level of the radio frequency ripple signal and the envelopes of the radio frequency signal.

In FIG. 7, the number 701 stands for radio frequency signal. The number 702 stands for the radio frequency signal peak envelope. The number 703 stands for the radio frequency signal bottom envelope. The number 705 stands for the radio frequency ripple signal. The number 706 is the central level of the radio frequency ripple signal. When there are fingerprints or dirt on the disks, or reflectivity irregularity of the disks, or lens shift of the optical pickup head, drop-out of the radio frequency signal peak envelope occurs, as the number 704 in the figure, and the drop-out of the corresponding central level of the radio frequency ripple signal 706 also occurs, where the drop-out causes distortion of the radio frequency ripple signal 705. Based on this phenomenon, the drop-out of the radio frequency signal peak envelope 702 can be used to amend the central level of the radio frequency ripple signal 706 such that the distortion of the radio frequency ripple signal 705 is compensated.

However, the radio frequency signal and the radio frequency ripple signal are sometimes processed by different circuits such that the reference voltages and the gains are different and need amendment. If the first reference voltage $V_{REF1}$ is the reference voltage of the radio frequency signal, the drop-out ratio $DR_{RFPE}$ of the radio frequency signal peak envelope 702 when there are fingerprints or dirt on the disks, or reflectivity irregularity of the disks, or lens shift of the optical pickup head as the number 704 in the figure is $$DR_{RFPE} = \frac{RFPE_{OK} - RFPE_{NG}}{RFPE_{OK} - V_{REF1}} \quad \text{(Equation 1)}$$

$RFPE_{OK}$ is the normal level of the radio frequency signal peak envelope when the drop-out does not occur, while $RFPE_{NG}$ is the abnormal level of the radio frequency signal peak envelope when the drop-out occurs.

Meanwhile, if the second reference voltage $V_{REF2}$ is the reference voltage of the radio frequency ripple signal, the drop-out ratio $DR_{RFCT}$ of the radio frequency ripple signal center level 706 when there are fingerprints or dirt on the disks, or reflectivity irregularity of the disks, or lens shift of the optical pickup head as the number 704 in the figure is $$DR_{RFCT} = \frac{RFCT_{OK} - RFCT_{NG}}{RFCT_{OK} - V_{REF2}} \quad \text{(Equation 2)}$$

$RFCT_{OK}$ is the normal level of the radio frequency ripple signal center level when the drop-out does not occur, while $RFCT_{NG}$ is the abnormal level of the radio frequency ripple signal center level when the drop-out occurs.

Because the radio frequency signal and the radio frequency ripple signal may be amplified or attenuated through different gains, a proportional relation between the drop-out ratio of the radio frequency signal peak envelope in 704 and the drop-out ratio of the central level of the radio frequency ripple signal exits, which is $$DR_{RFCT} = K \times DR_{RFPE} \quad \text{(Equation 3)}$$

From equation 1 to equation 3, if the drop-out ratio $DR_{RFPE}$ of the radio frequency signal peak envelope in 704 is detected, the drop-out ratio $DR_{RFCT}$ of the central level of the radio frequency ripple signal can be revised. The formula is as follows:

$$RFCT_{NG} = RFCT_{OK} - K \times \frac{(RFPE_{OK} - RFPE_{NG}) \times (RFCT_{OK} - V_{REF2})}{(RFPE_{OK} - V_{REF1})} \quad \text{(Equation 4)}$$

Therefore, from equation 4, the abnormal central level $RFCT_{NG}$ of the radio frequency ripple signal is generated dynamically to amend the radio frequency ripple signal.

Figure 8:
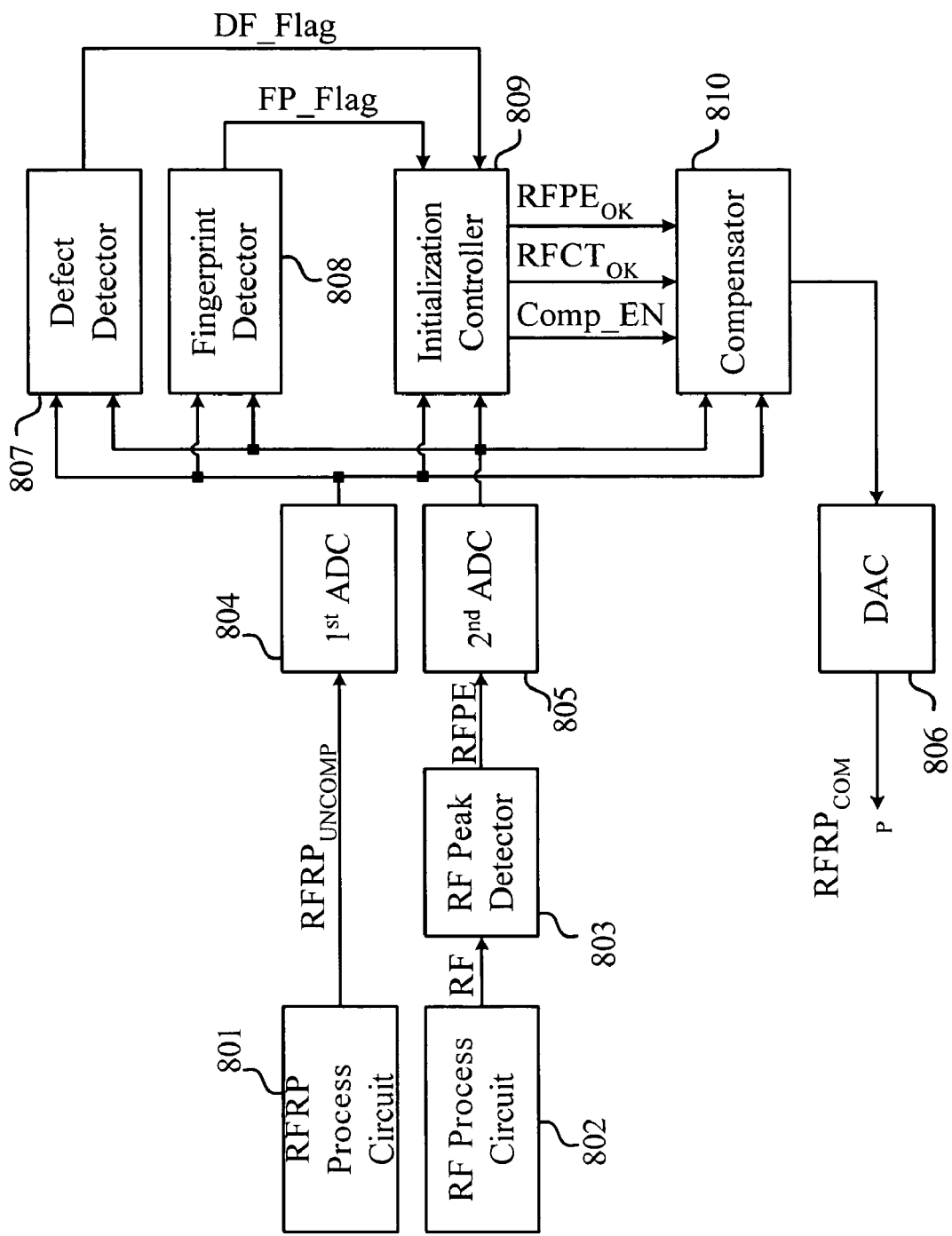
FIG. 8 is the circuit of the first preferred embodiment of the invention.

FIG. 8 illustrates the first preferred embodiment of the invention. The radio frequency ripple signal (abbreviated as RFRP in the following) process circuit 801 generates the radio frequency ripple signal $RFRP_{UNCOMP}$, which is not compensated.

The radio frequency signal (abbreviated as RF in the following) process circuit 802 generates the radio frequency signal RF. The radio frequency signal peak detector 803, which is coupled to the output of the RF process circuit 802, generates the radio frequency signal peak envelope RFPE. The first analog to digital converter 804, which is coupled to the RFRP process circuit 801, and the second analog to digital converter 805, which is coupled to the RF peak detector 803, convert analog signals to digital signals. The defect detector 807 and the fingerprint detector 808 are connected to the first analog to digital converter 804 and the second analog to digital converter 805 to detect whether there are defects or fingerprints on the disk. When the defect detector 807 detects defects on the disk, the level of a defect flag DF_Flag is changed from low level to high level, i.e., from 0 to 1. When the fingerprint detector 808 detects fingerprints or dirt on the disk, the level of a fingerprint flag FP_Flag is changed from low level to high level, i.e., from 0 to 1. The defect flag DF_Flag from the defect detector 807 and the fingerprint flag FP_Flag from the fingerprint detector 808 are delivered to an initialization controller 808. Actually, the defect detector 807 and the fingerprint detector 808 can be implemented by either digital circuits or analog circuit. The initialization controller 809 is needed to obtain the normal level $RFPE_{OK}$ of the radio frequency signal peak envelope and the normal level $RFCT_{OK}$ of the radio frequency ripple signal center level when there is no lens shift of the optical pickup head, no defect, no fingerprint and no dirt on the disk. Thus, the initialization controller 809 only operates when there is no lens shift of the optical pickup head, no defect, no fingerprint and no dirt on the disk. When there is a defect, fingerprint or dirt on the disk, the deflect flag DF_Flag from the defect detector 807 and the fingerprint flag FP_Flag from the fingerprint detector 808 are delivered to the initialization controller 809, such that the process is controlled by the initialization controller 809 based on the deflect flag DF_Flag and the fingerprint flag FP_Flag.

Figure 9:
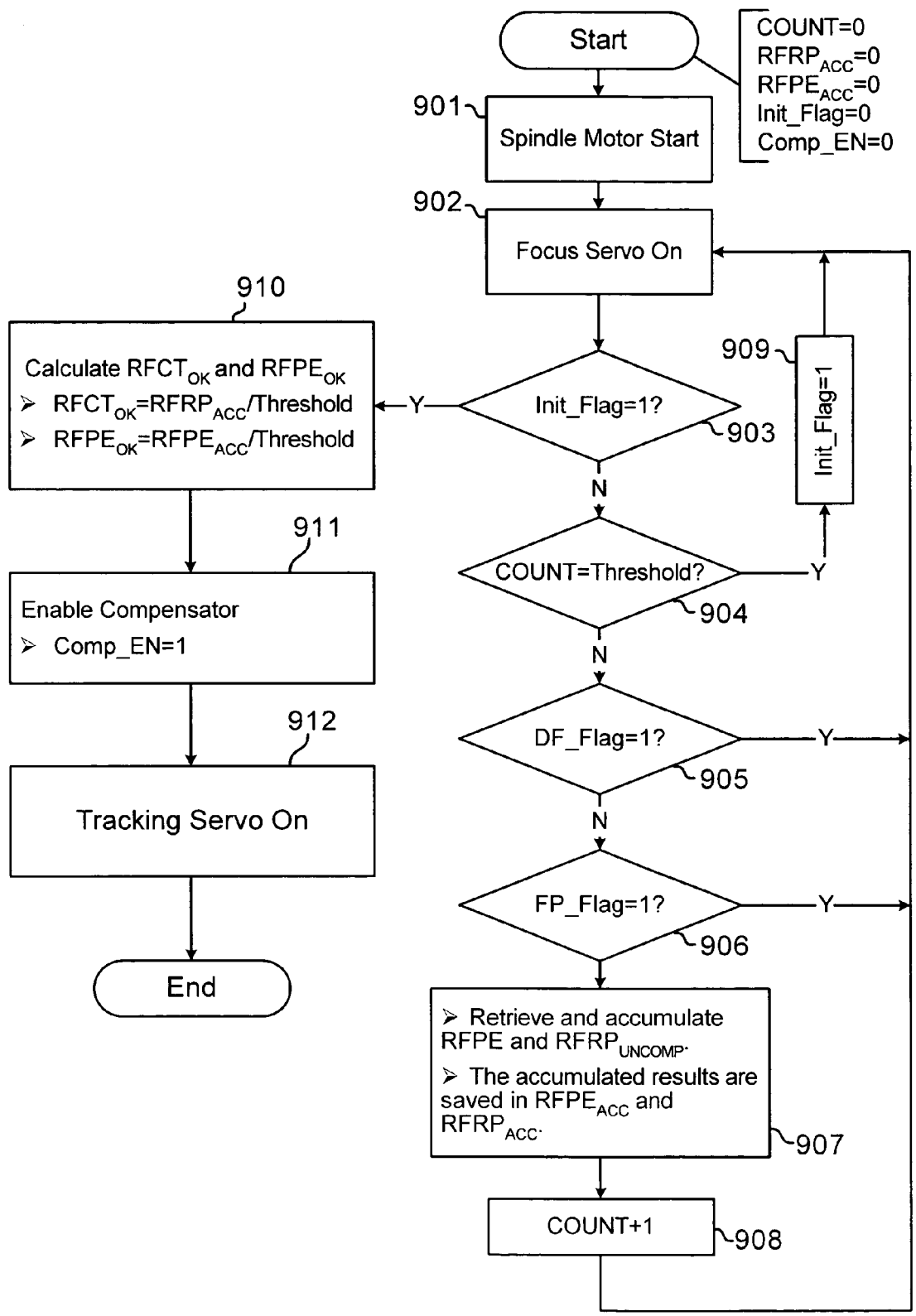
FIG. 9 is the flow chart for initializing the radio frequency ripple signal compensation device of the invention.

FIG. 9 the flow chart of the initialization controller 809 for initializing the radio frequency ripple signal compensation device of the invention. The spindle motor starts rotating in step 901. The focus servo system activates in step 902. Meanwhile, some parameters are also initialized. The value of the counter, COUNT, is set as 0. The accumulating value of the radio frequency ripple signal, $RFRP_{ACC}$, is set to 0. The accumulating value of the radio frequency signal peak envelope, $RFPE_{ACC}$, is set as 0. The initialization flag, Init_Flag, is set as 0 and the enable signal of the compensator of the radio frequency ripple signal, Comp_EN, is set as 0. A threshold value, Threshold, is also determined in the initialization process.

If the initialization flag, Init_Flag, is 0 in step 903, the flow goes to step 904 to check whether the counting value, COUNT, is equal to the threshold value, Threshold. If the two values are equal, the flow goes to step 909 to set the initialization flag, Init_Flag, as 1. At this time, samples are sufficient for further processing. The threshold value, Threshold, represents the desired samples. The larger the threshold value, the higher accuracy the normal central level $RFCT_{OK}$ of the radio frequency ripple signal and the normal level $RFPE_{OK}$ of the radio frequency signal peak envelope have, and the longer the spent time. On the contrary, the smaller the threshold value, the lower accuracy the normal central level $RFCT_{OK}$ of the radio frequency ripple signal and the normal level $RFPE_{OK}$ of the radio frequency signal peak envelope have, and the shorter the spent time. If the counting value, COUNT, is not equal to the threshold value, Threshold, the flow goes to step 905. Defects on the disk are detected by the defect flag DF_Flag output from the defect detector 807. The defect flag DF_Flag equal to 1 means that there are defects on the disk. These defects on the disk cause the drop-out to appear in the uncompensated radio frequency ripple signal $FRP_{UNCOMP}$ and the radio frequency signal peak envelope RFPE. Therefore, the sample is not adopted and the flow returns back to step 903. The defect flag DF_Flag equals to 0 means that there are no defects on the disk. The sample is adopted and the flow goes to step 906. In step 906, the appearance of fingerprints or dirt on the disk is detected by the fingerprint flag FP_Flag from the fingerprint detector 808. The fingerprint flag FP_Flag equals to 1 means that there are fingerprints or dirt on the disk. These fingerprints or dirt on the disk cause the drop-out to appear in the uncompensated radio frequency ripple signal $RFRP_{UNCOMP}$ and the radio frequency signal peak envelope RFPE. Therefore, the sample is not adopted and the flow returns back to step 903. The fingerprint flag FP_Flag equals to 0 means that there are no fingerprints or dirt on the disk. The sample is adopted and the flow goes to step 907. In step 907, the uncompensated radio frequency ripple signal $RFRP_{UNCOMP}$ is delivered to the first analog to digital converter 804 and the radio frequency signal peak envelope RFPE is delivered to the second analog to digital converter 805. Both signals are accumulated, and then are stored in a radio frequency ripple signal accumulated variable, $RFRP_{ACC}$, and a radio frequency signal peak envelope accumulated variable, $RFPE_{ACC}$. The flow goes to step 908 to add one to the counting value, COUNT, and then returns to step 903.

If the initialization flag, Init_Flag, is 1 in step 903, the initializing process is complete and the flow goes to step 910 to compute the normal central level $RFCT_{OK}$ of the radio frequency ripple signal and the normal level $RFPE_{OK}$ of the radio frequency signal peak envelope. Then the flow goes to step 911 to set the enable signal of the compensator of the radio frequency ripple signal, Comp_EN, as 1 for activating the compensator 810. The track following servo system then activates in step 912.

Figure 10:
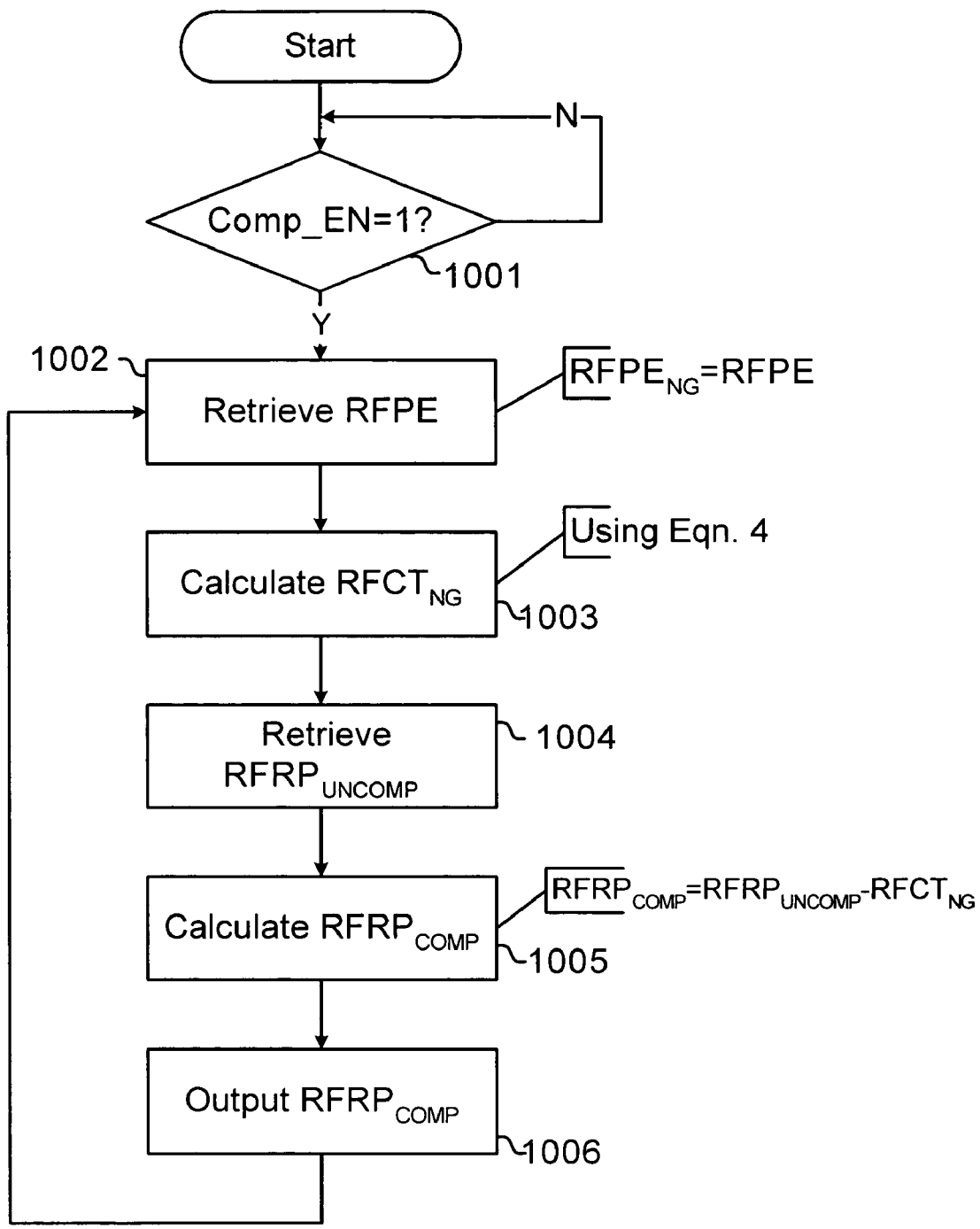
FIG. 10 is the operation flow chart for the radio frequency ripple signal compensation device of the invention.

FIG. 10 is the operation flow chart for the radio frequency ripple signal compensator 810 of the invention. In step 1001, it is determined whether or not the compensator 810 is activated. If the enable signal, Comp_EN, is 0, the compensator 810 does not activate. The flow continuously checks the enable signal, Comp_EN, until it is equal to 1. If the enable signal, Comp_EN, is equal to 1, the initializing of the compensator 810 is complete, and the compensator 810 has been activated. The flow then goes to step 1002 to store the radio frequency signal peak envelope from the second analog to digital converter 805 into the abnormal level variable of the radio frequency signal peak envelope, $RFPE_{NG}$. Then the flow goes to step 1003 to compute the abnormal central level variable of the radio frequency ripple signal, $RFCT_{NG}$. Step 1004 then obtains the uncompensated radio frequency ripple signal $RFRP_{UNCOMP}$ by retrieving data from the first analog to digital converter 804, and step 1005 calculates the compensated radio frequency ripple signal $RFRP_{COMP}$, which is equal to the uncompensated radio frequency ripple signal $RFRP_{UNCOMP}$ subtracting the abnormal central level variable of the radio frequency ripple signal, $RFCT_{NG}$. Step 1006 delivers the compensated radio frequency ripple signal $RFRP_{COMP}$ to the digital to analog converter 806. Then, the flow returns back to 1002 to repeatedly generate the compensated radio frequency ripple signal $RFRP_{COMP}$.

Figure 11:
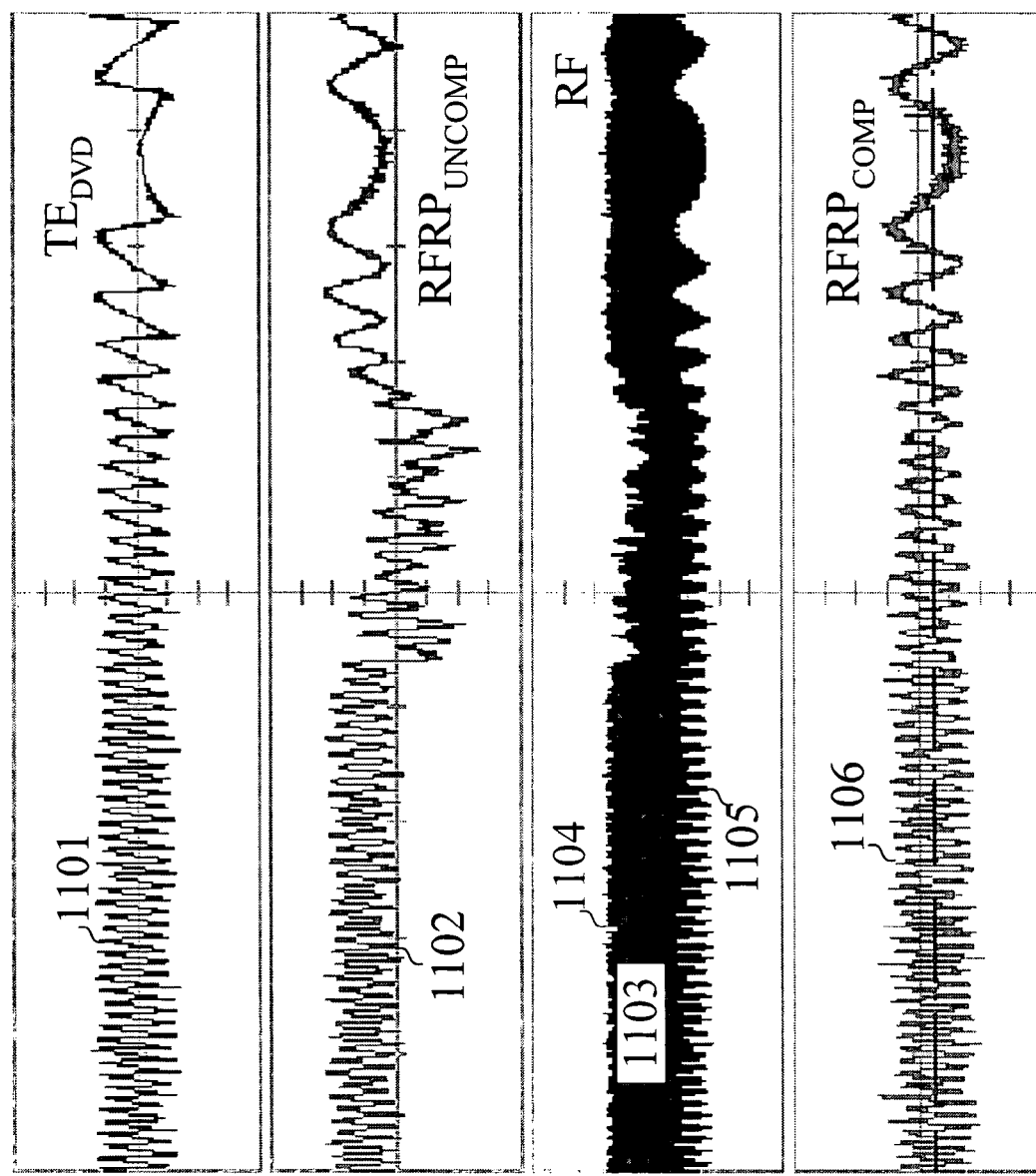
FIG. 11~FIG. 13 show the signals of the radio frequency ripple compensation device of the invention.

FIG. 11 illustrates the signals derived from the compensator of the invention when there are fingerprints on the disk. The number 1101 is the tracking error signal $TE_{DVD}$ of the DVD disk. The number 1102 is the uncompensated radio frequency ripple signal $RFRP_{UNCOMP}$, while 1103 is the radio frequency signal RF. The number 1104 is the radio frequency signal peak envelope RFPE. The number 1105 is the radio frequency signal bottom envelope RFBE. The number 1106 is the compensated radio frequency ripple signal $RFRP_{COMP}$. FIG. 11 shows that the drop-out of the central level of the uncompensated radio frequency ripple signal $RFRP_{UNCOMP}$ occurs and the track cross waveform is distorted. This is because the drop out of the uncompensated radio frequency ripple signal $RFRP_{UNCOMP}$ caused by fingerprints on the disk covers a wide range in frequency domain even the frequencies of the track cross waveform of the radio frequency ripple signal. Accordingly, not only the offset of the uncompensated radio frequency ripple signal $RFRP_{UNCOMP}$ in low frequency is biased but also the track cross waveform of the radio frequency ripple signal is distorted. These facts show why the prior art cannot deal with the drop-out of the central level of the radio frequency ripple signal RFRP and the distortion of the track cross waveform of the radio frequency ripple signal RFRP at the same time. However, the compensated radio frequency ripple signal $RFRP_{COMP}$ in FIG. 11 of the present invention does not have drop-out, and the track cross waveform of the radio frequency ripple signal is not distorted.

Figure 12:
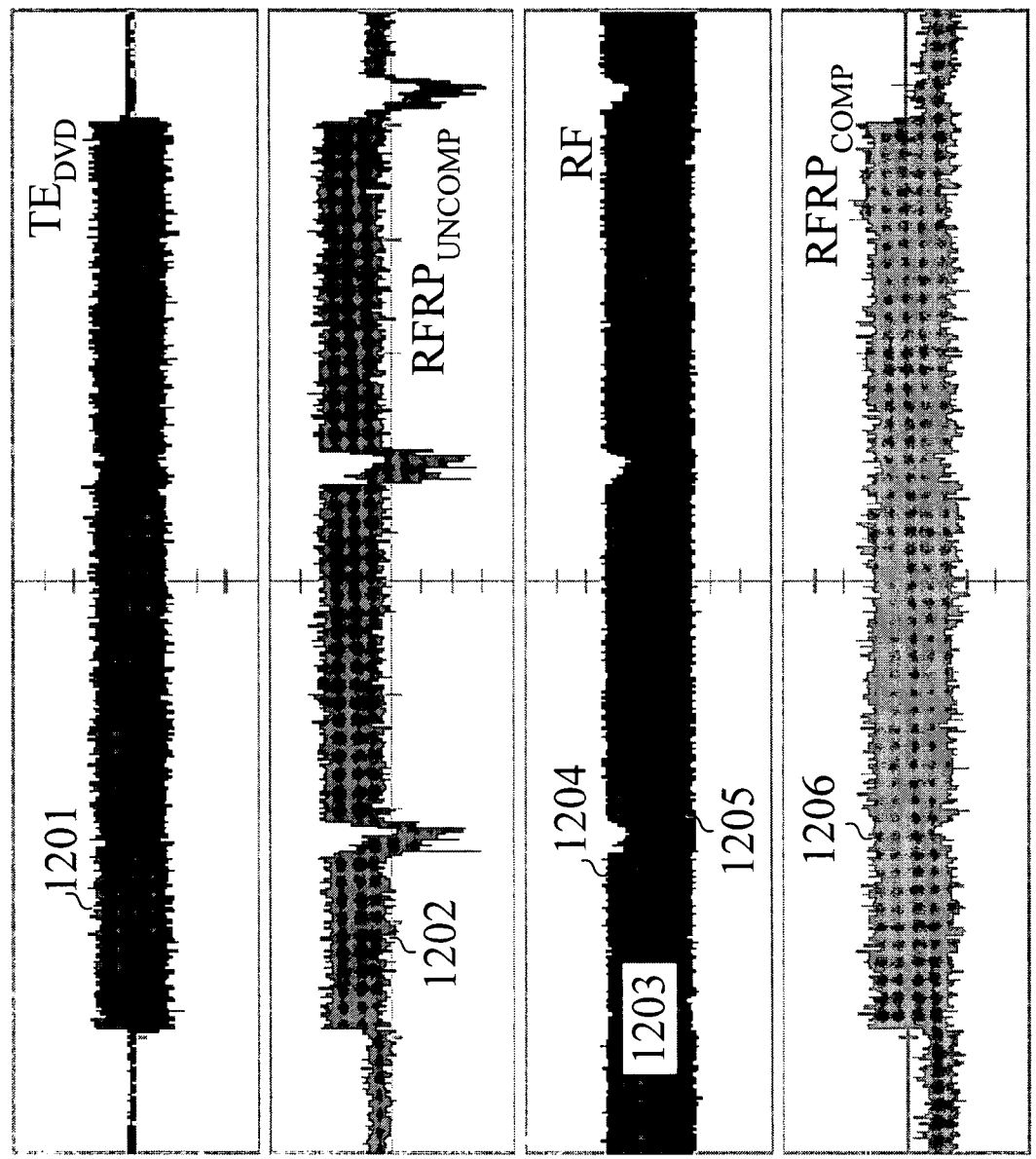

FIG. 12 shows the signals when there are fingerprints on the disk during short distance track seeking. The number 1201 is the tracking error signal $TE_{DVD}$ of the DVD disk. The number 1202 is the uncompensated radio frequency ripple signal $RFRP_{UNCOMP}$, while 1203 is the radio frequency signal RF. The number 1204 is the radio frequency signal peak envelope RFPE. The number 1205 is the radio frequency signal bottom envelope RFBE. The number 1206 is the compensated radio frequency ripple signal $RFRP_{COMP}$. From the uncompensated radio frequency ripple signal $RFRP_{UNCOMP}$ in FIG. 12, fingerprints or dirt appearing on the disk occur many times during the short distance track seeking. The appearance of fingerprints or dirt on the disk causes the drop-out of the central level of the radio frequency ripple signal and distorts the track cross waveform. However, the compensated radio frequency ripple signal $RFRP_{COMP}$ is not affected by fingerprints or dirt on the disk with the compensation device of the invention, and the track cross waveform is not distorted Therefore, the stability during short distance track seeking can be maintained.

Figure 13:
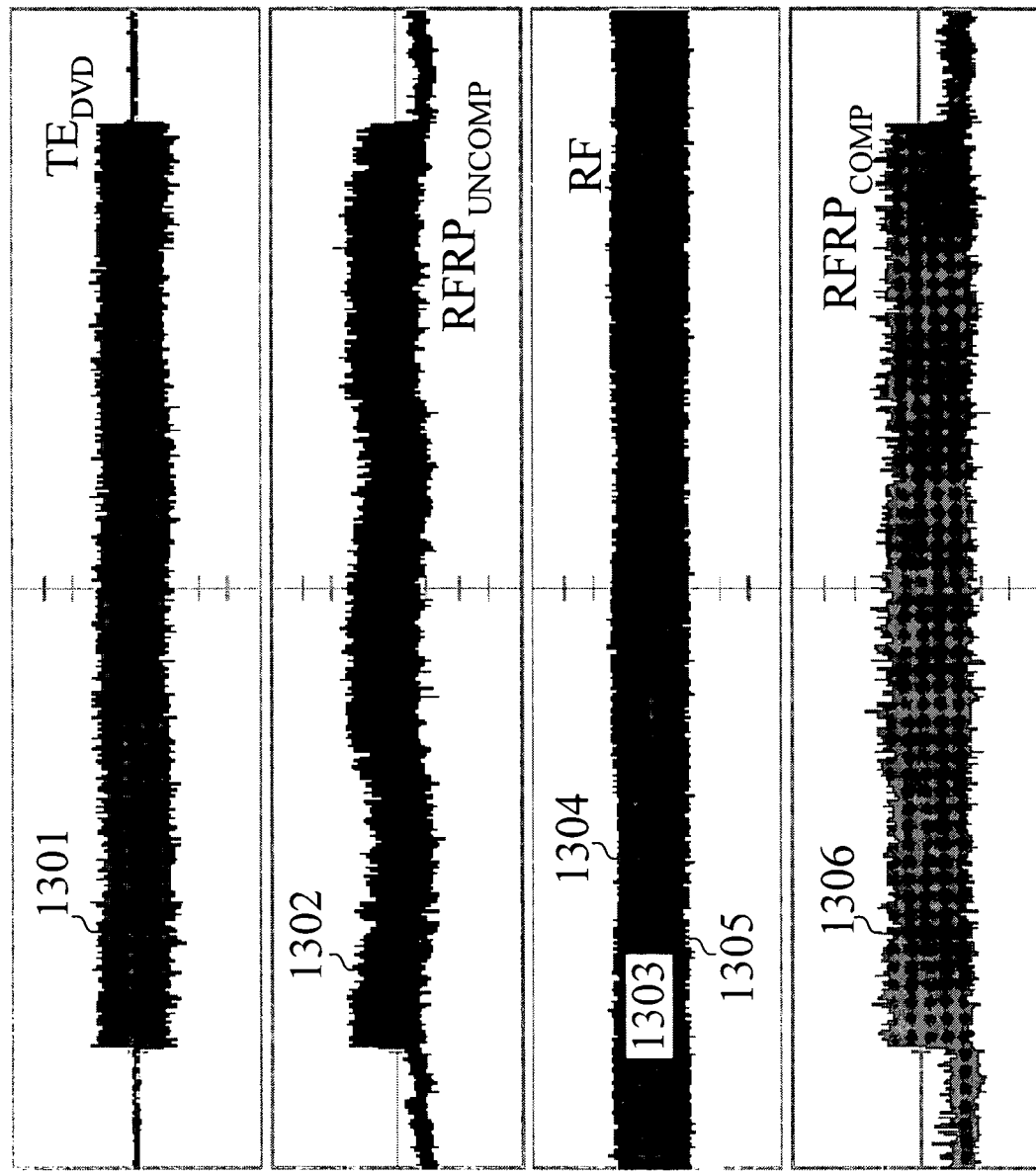

FIG. 13 shows the signals when there is a lens shift of the optical pickup head during short distance track seeking. The number 1301 is the tracking error signal $TE_{DVD}$ of the DVD disk. The number 1302 is the uncompensated radio frequency ripple signal $RFRP_{UNCOMP}$, while 1303 is the radio frequency signal RF. The number 1304 is the radio frequency signal peak envelope RFPE. The number 1305 is the radio frequency signal bottom envelope RFBE. The number 1306 is the compensated radio frequency ripple signal $RFRP_{COMP}$. During short distance track seeking, the drop-out of the central level of the radio frequency ripple signal $RFRP_{UNCOMP}$ is caused by lens shift of the optical pickup head. However, the compensated radio frequency ripple signal $RFRP_{COMP}$ is not affected by lens shift of the optical pickup head with the compensation device of the invention, and the drop-put of the central level does not occur. Therefore, the stability during short distance track seeking can be maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compensation device of radio frequency ripple signal, comprising:
    a radio frequency ripple signal process circuit for generating the radio frequency ripple signal;
    a radio frequency signal process circuit for generating a radio frequency signal;
    a radio frequency signal peak detector, which is coupled to the output of the radio frequency signal process circuit thereby generating a radio frequency signal peak envelope;
    a first analog to digital converter, which is coupled to the radio frequency ripple signal process circuit for converting the radio frequency ripple signal;
    a second analog to digital converter, which is coupled to the radio frequency signal peak detector for converting the radio frequency signal peak envelope;
    a defect detector, which is coupled to the first analog to digital converter and the second analog to digital converter;
    a fingerprint detector, which is coupled to the first analog to digital converter and the second analog to digital converter; and
    an initialization controller, which is coupled to the defect detector, the fingerprint detector, the first analog to digital converter and the second analog to digital converter.

2. The compensation device of claim 1, wherein the radio frequency ripple signal is uncompensated.

3. The compensation device of claim 1, wherein the defect detector and the fingerprint detector are implemented by analog circuit or digital circuit.

4. The compensation device of claim 1, wherein when the defect detector detects defects on the optical disk, level of a defect flag is changed from low to high.

5. The compensation device of claim 1, wherein when the fingerprint detector detects fingerprints or dirt on the optical disk, level of a fingerprint flag is changed from low to high.

6. The compensation device of claim 1, wherein the defect flag from the defect detector and the fingerprint flag from the fingerprint are delivered to the initialization controller such that the initialization controller controls the entire process.

* * * * *